S. H. HALL.
MILKING MACHINERY.
APPLICATION FILED FEB. 3, 1920.

1,398,230.

Patented Nov. 29, 1921.

WITNESS:
Rob. W. Kitchel.

INVENTOR
Selden H. Hall
BY Frank L. Busser
ATTORNEY.

UNITED STATES PATENT OFFICE.

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING MACHINERY.

1,398,230.     Specification of Letters Patent.     Patented Nov. 29, 1921.

Application filed February 3, 1920. Serial No. 356,000.

*To all whom it may concern:*

Be it known that I, SELDEN H. HALL, a citizen of the United States, residing at Poughkeepsie, county of Dutchess, and State of New York, have invented a new and useful Improvement in Milking Machinery, of which the following is a full, clear, and exact description, reference being had to the accompanying drawings, which form a part of this specification.

In milking machinery comprising a vacuum pipe line adapted for connection with a milking machine unit, more or less dirt, water and milk may gain access to the pipe system and thence pass to the vacuum pump, which is injurious to the pump. The object of my invention is to arrest these contaminating liquids and solids as they flow through the vacuum pipe and thereby prevent their passage to the pump. The invention comprises the combination, with the vacuum pipe of a cow milking outfit, of a trap which, by reason of its construction and its mode of attachment to the vacuum pipe, will act to catch contaminating fluids and solids and keep them away from the vacuum pump. The trap is so constructed that it will be air-tight during operation and so that it may be easily taken apart, cleaned and reassembled.

In the accompanying drawings, which show a preferred embodiment of my invention:

The disk-like cover $a$ is provided with an inlet channel $b$ and an outlet channel $c$. Each channel opens at one end laterally away from the cover and at the other end downwardly toward the receptacle $k$. The wall of each channel connecting its lateral and downward openings is curved as shown to facilitate the flow of the incoming or outgoing air. The laterally projecting end of channel $b$ is shaped and internally threaded to form a pipe connection $d$ while the downwardly projecting inflow end terminates in a nozzle $e$. The outer channel $c$ is provided with a similar pipe connection $f$ and a bell-mouthed outflow end $g$. Preferably the nozzle end of channel $b$ is of substantially smaller diameter than the mouth of channel $c$. The pipe connection $d$ is secured to the stanchion section of the vacuum pipe line $x$ adapted for connection with a milking machine unit and the pipe connection $f$ is secured to the other section of the vacuum pipe line $x$, which is connected to the vacuum pump $y$. Thereby the outflow connection from the trap is more capacious than the inflow connection thereto.

Figure 1:
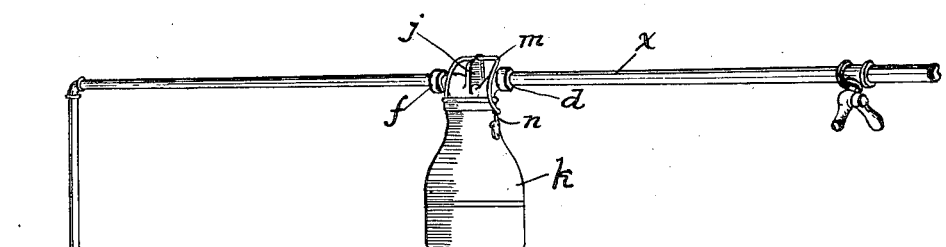
Figure 1 is a view of a part of a milking system embodying my invention.
Figure 2:
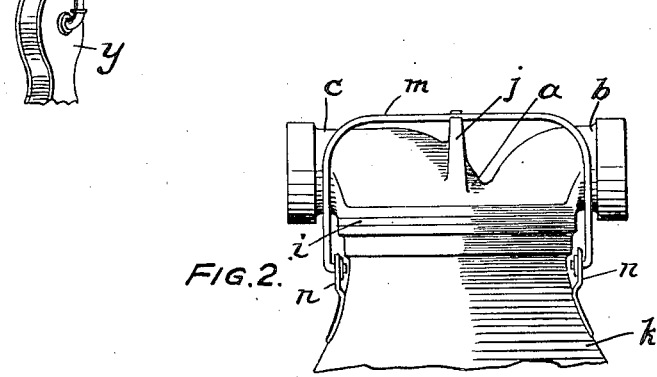
Fig. 2 is a side view of the cover and the upper part of a receptacle for collected matter.
Figure 3:
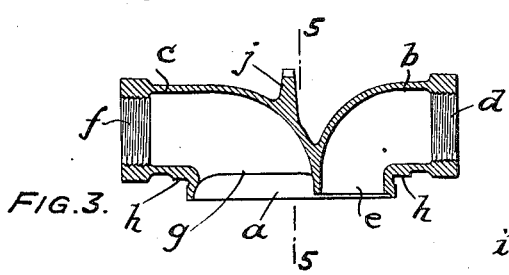
Fig. 3 is a vertical section through the cover.
Figure 5:
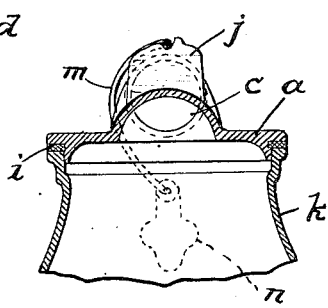
Fig. 5 is a section on line 5—5 of Fig. 3.
Figure 4:
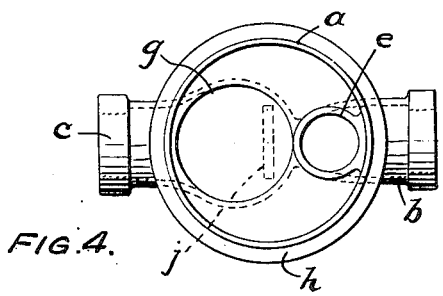
Fig. 4 is an inverted plan view of the cover.

On the under side of the cover and surrounding the inlet and outlet is a seat $h$ for a gasket $i$. Attached to the outlet passage and above the center of the disk is a lug $j$ extending higher than the inlet and outlet. A receptacle, shown in Fig. 1 and part of which is shown in Fig. 2, may have a body $k$ of any desired form. At its top is an opening adapted to fit against the gasket $i$. A bail $m$, attached to the body $k$ by ears $n$, is adapted to be forced over the lug $j$ and thus draw the top of the receptacle against the gasket $i$.

Foul air coming from the stanchion pipe line is turned and projected downward at high velocity by the nozzle $e$. Dirt and water will collect in the bottom of the receptacle while air moving at slow velocity will enter the bell-mouthed outlet $g$ and pass to the pipe leading to the pump.

When it is desired to clean the receptacle, the bail $m$ may be forced off the lug $j$ and the receptacle easily removed. After cleaning, the receptacle may be lifted into place and the bail forced over the lug. This will draw the top of the receptacle into contact with the gasket. When the air is exhausted from the receptacle, atmospheric pressure will force it toward the cover, compressing the gasket and making a tight joint.

Having now fully described my invention, what I claim and desire to protect by Letters Patent is:

1. A vacuum pipe line for a milking system comprising an air pipe adapted for connection at one end to a vacuum pump and at the other end to a milking machine unit, of a coupling interposed in said air pipe and adapted to prevent the passage of contaminating liquids or solids to the vacuum pump, said coupling comprising means to deflect the flow of air, a receptacle at the air deflecting point wherein said contaminating liquids or solids are trapped, and means to reduce the speed of the air outgoing from the receptacle below the speed of the incoming air.

2. A vacuum pump line for a milking machine system comprising an air pipe line composed of an air pipe section adapted for connection with the milking machine unit and an air pipe section adapted for connection with a vacuum pump, of a coupling having an inwardly and downwardly extending inlet connected with the first air pipe section and an upwardly and outwardly extending outlet of larger capacity than said inlet connected with the second air pipe section, and a receptacle suspended from said coupling wherein the flow of air is deflected and which functions as a trap to prevent the passage of contaminating liquids or solids from the first air pipe section to the second air pipe section.

3. The combination with a vacuum pipe line for a milking system, having a vacuum pump and a milking machine connection, of an air deflector in said pipe line between the pump and said milking machine connection, comprising a coupling having an inwardly and downwardly extending inlet and an upwardly and outwardly extending outlet of larger capacity than said inlet, means for connecting the vacuum pipe to said inlet and outlet to form air-tight joints, a removable receptacle suspended from said coupling having a receiving chamber communicating with the lower ends of the inlet and outlet, and means for forming an air-tight joint between the receptacle and coupling.

4. The combination with a vacuum pipe line for a milking system, having a vacuum pump and a milking machine connection, of an air deflector in said pipe line between the pump and said milking machine connection, comprising a coupling having an inwardly and downwardly extending inlet and an upwardly and outwardly extending outlet, means for connecting the vacuum pipe to said inlet and outlet to form air-tight joints, a removable receptacle suspended from said coupling having a receiving chamber communicating with the lower ends of the inlet and outlet, the cross-section of said outlet being of gradual decreasing area in the direction of the flow of air whereby the velocity of the outgoing air from the chamber is reduced below the speed of the incoming air to prevent sucking foreign matter from the chamber, and means for forming an air-tight joint between the receptacle and coupling.

In testimony of which invention, I have hereunto set my hand, at Poughkeepsie, N. Y., on this 29 day of January, 1920.

SELDEN H. HALL.